United States Patent [19]
Fuesser et al.

[11] Patent Number: 6,105,546
[45] Date of Patent: Aug. 22, 2000

[54] INTAKE SYSTEM FOR AN INTERNAL COMBUSTION ENGINE

[75] Inventors: Rolf Fuesser, Bad Herrenalb; Hans-Joachim Esch, Heimsheim, both of Germany

[73] Assignee: Filterwerk Mann & Hummel GmbH, Ludwigsburg, Germany

[21] Appl. No.: 09/284,199

[22] PCT Filed: Sep. 18, 1997

[86] PCT No.: PCT/EP97/05117

§ 371 Date: May 26, 1999

§ 102(e) Date: May 26, 1999

[87] PCT Pub. No.: WO98/15727

PCT Pub. Date: Apr. 16, 1998

[30] Foreign Application Priority Data

Oct. 10, 1996 [DE] Germany .......................... 196 41 715

[51] Int. Cl.[7] .................................................. F02B 27/02
[52] U.S. Cl. ........................................................ 123/184.57
[58] Field of Search .................. 123/184.57, 184.56, 123/184.53

[56] References Cited

U.S. PATENT DOCUMENTS

| | | | |
|---|---|---|---|
| 4,494,493 | 1/1985 | Morikawa et al. | 123/184.52 |
| 4,538,556 | 9/1985 | Takeda | 123/184.57 |
| 4,539,947 | 9/1985 | Sawada et al. | 123/184.57 |
| 4,546,733 | 10/1985 | Fukami et al. | 123/184.57 |
| 4,794,885 | 1/1989 | Honda et al. | 123/184.56 |
| 4,862,840 | 9/1989 | Matsunaga et al. | 123/184.56 |
| 5,107,800 | 4/1992 | Araki et al. | 123/184.57 |
| 5,628,287 | 5/1997 | Brackett et al. | 123/184.57 |

FOREIGN PATENT DOCUMENTS

WO 93/23658  11/1993  WIPO.

*Primary Examiner*—Marguerite McMahon
*Attorney, Agent, or Firm*—Evenson, McKeown, Edwards & Lenahan, P.L.L.C.

[57] ABSTRACT

An intake system for an internal combustion engine in which the intake system includes an air inlet (10), an air filter (11), a main flow duct (12) and individual ducts (13 to 16) leading from the main flow duct to the internal combustion engine cylinders. The intake system includes at least one shunt resonator (18) which includes at least one neck (20) and a resonator volume (19), the length and/or cross section of the neck (20) being variable.

9 Claims, 11 Drawing Sheets

INTAKE SYSTEM FOR AN INTERNAL COMBUSTION ENGINE

BACKGROUND OF THE INVENTION

The invention relates to an intake system for an internal combustion engine.

DE OS 42 16 255 discloses an intake tube for an internal combustion engine. This intake tube is comprised of a number of individual intake tubes which are connected at the inlet end to a manifold tube. The intake tube is made in one piece and manufactured by the blow molding method. Between two individual intake tubes a shunt resonator is provided. This is a short tube section which produces a cancellation of sound waves of a specific frequency. The length of the tube section is to be tuned to the sound waves and amounts to $\lambda/4$. It is also possible to connect this shunt resonator with a clean air chamber of the air filter housing. However, an arrangement as close as possible to the sound source is preferred. The disclosed shunt resonator is effective at a specific frequency, i.e., thus also at a specific speed of the internal combustion engine. Thus, if undesired sound waves are to be masked out in various speed ranges of the internal combustion engine, it would be conceivable to arrange for a plurality of shunt resonators and tune them to the corresponding frequencies. This, however, requires a considerable amount of space.

SUMMARY OF THE INVENTION

It is the object of the invention to avoid the aforementioned disadvantages and provide an intake system for an internal combustion engine which has a shunt resonator which is effective over a broad frequency spectrum, while having a volume or requiring little space.

This object is achieved by an intake system as described hereinafter. The substantial advantage of the invention is that the factors relevant to frequency are made variable and thus it is possible to adapt the shunt resonator to the motor speed in a continuous or discontinuous manner. This adaptation is performed, for example, with dampers which close certain tubes or by means for varying the cross section of tubes, such as throttles operating steplessly, for example. It is also possible to vary the length of tubes by means of a telescoping configuration.

In accordance with one embodiment of the invention it is proposed also to make the resonator volume variable. This is variable, for example, by dividing a large volume into a plurality of partial volumes and opening and closing these partial volumes. The size of the shunt resonator can be varied in a simple manner depending on the rotational speed and/or depending on the load state of the internal combustion engine. For this purpose, appropriate speed sensors and sensors for measuring the vacuum in the intake manifold in order to determine the load state can be used.

To increase the effect of a shunt resonator, it is proposed in accordance with another embodiment of the invention to divide the main flow duct into segments and especially in the low-frequency range to shut off one segment, i.e., one part of the main duct.

One embodiment of the invention envisions that a first neck, commencing from the main duct, extends into the cavity of the shunt resonator, and a second neck having a multiple of the cross section of the first neck, is likewise connected to the main duct and the cavity of the shunt resonator. In different frequency ranges it is possible by means of suitable dampers to open or close both necks or only one neck.

It is proposed in a further embodiment to provide an additional neck with a narrow cross section but with twice the length of the first neck. This neck too can be equipped with a damper and serves to suppress particularly low frequencies in the 50 Hz range.

In accordance with a further embodiment of the invention it is proposed to attach several adjusting dampers on a single shaft. This has the advantage that only one or two actuators are necessary for the operation of the dampers.

These and other features of preferred embodiments of the invention will be found not only in the claims but also in the description and the drawings, it being possible for the individual features to be realized individually or together in the form of sub-combinations in embodiments of the invention and in other fields, and may represent advantageous and independently patentable embodiments for which protection is hereby claimed.

BRIEF DESCRIPTION OF THE DRAWINGS

The invention is explained in further detail hereinafter with reference to working embodiments.

DETAILED DESCRIPTION OF PREFERRED EMBODIMENTS

Figure 1:
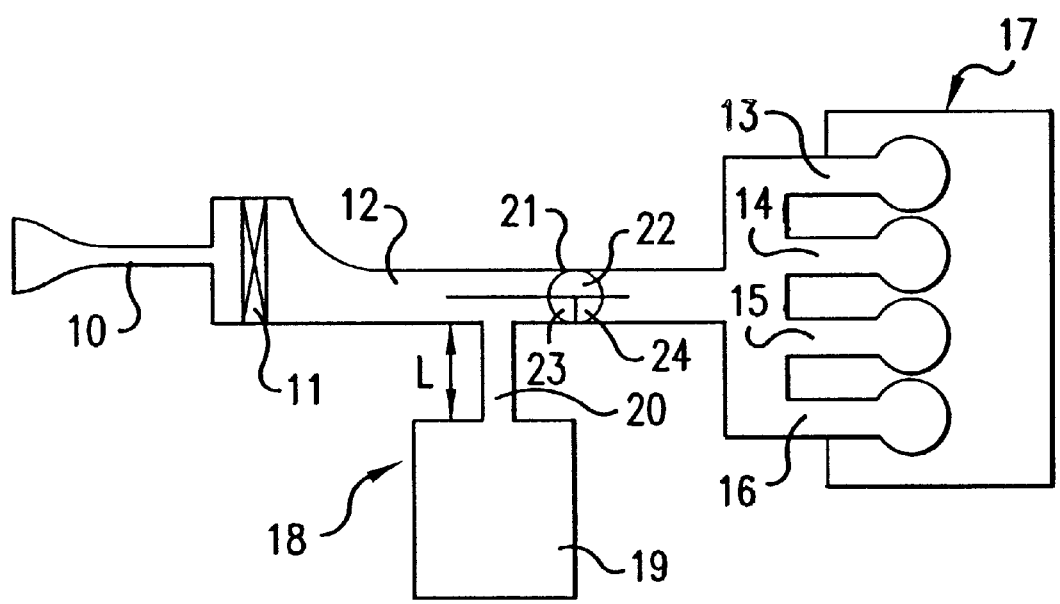
FIG. 1 shows a schematic representation of an intake system.

An air intake system according to FIG. 1 comprises an air inlet 10, a subsequent air filter 11, a main flow duct 12 and, commencing from the main flow duct, individual ducts 13, 14, 15, 16, which lead to the cylinders of an internal combustion engine 17. A shunt resonator 18 is coupled to the main flow duct. This resonator comprises a resonant cavity 19 and a resonator neck 20. As already mentioned, shunt resonators operate reliably in the frequency range to which they are tuned. They are therefore a proven means for selectively counteracting unwanted frequency ranges. For this purpose their dimensions must comply with the Helmholtz resonator formula:

$$\text{Resonance frequency } f_{res} = \text{sound propagation velocity}/2\text{Pl} * \sqrt{\text{area/neck length/volume}}_{neck}$$

With a volume of, for example, 1500 cm³, a neck diameter of 2 cm and a neck length l of 18 cm, a resonator frequency of 58 Hz is established. When connected to the main flow duct 12 of a 4-cylinder 4-cycle motor, the shunt resonator 18 has a canceling action on the second order of the motor frequency at n=1,750 rpm. The greater the ratio of neck cross-sectional area main stream/main duct cross-sectional area is, the better the effect will be. If it is desired to improve the effectiveness by enlarging the cross-sectional area of the neck, then in order to maintain the $f_{res}$, either the neck length or the volume or both must be increased. This is often impossible for structural reasons. For improvement it is also possible to make the main duct narrower. But this would lead to problems in the high power range of the motor.

The solution is offered by the segmentation of the main or main flow duct and a shunt resonator with an adapter circuit. The main air duct is narrowed only in the rotational speed range in which the shunt resonator is to operate. Since the need to suppress low-tone components exists only in the low speed range, the main duct for operation in this range can have its cross section reduced without impairing the engine torque. For this purpose the flow area of the main or main flow duct 12 is divided into three segments, as in the cross-section 21, two of which segments can be closed by dampers. Thus three parallel channels are formed, in which the lower two serve for connecting the shunt resonator for low-tone suppression. The damper of the upper, semicircularly-shaped channel portion 22 closes whenever the speed drops below 3,000 rpm. The damper 23 of the left channel portion closes when the rotational speed enters the lowest range. Dampers can also serve to adjust the shunt resonator to a frequency required by a particular rotational speed. With a system of branch ducts and dampers different resonance frequencies can be established, each of which becomes effective when the respective rotational speed is reached.

The system illustrations of FIGS. 2a–e show the design of a shunt resonator which in spite of being adapted for low-tones takes up a space of only 1,500 cm$^3$. FIG. 2 shows the middle portion, a side elevation of the main duct 12 and shunt resonator 18, on the left side a section taken along line A, and on the right side a section taken along line B. In the segmented main flow duct 12 a swivel damper 25 is provided which closes the channel portion 22, as well as a pivotable damper 26. This closes the channel portion 23. Channel portion 24 is open, as illustrated in section A—A. A resonator neck 27 leads from channel portion 23 into the resonator cavity 19. In the position shown here, however, this neck is closed by a pivotable damper 28. A further resonator neck 29 is in communication with channel portion 24. This resonator neck has about twice the length of the resonator neck 27. At its lower end there is a pivotable damper 30 which produces a shortening or a lengthening of the resonator neck. In the position shown here it is likewise closed.

Outside of the segmented portion of the main duct 12 there is an additional resonator neck 31. This one is in communication with the main flow duct 12 through a rotatable damper 32. In the position shown here, this rotatable damper is closed. Another flap damper 33, which is on the resonator neck 31, is likewise closed. The damper position shown here is suitable for in the 40 Hz range, i.e., for the lower rotational speed range. For this purpose only the channel portion 24 is open to supply clean air to the internal combustion engine. At the same time, this channel portion is connected with the resonator neck 29. In this way an extremely low tuning frequency can be achieved.

Figure 2A:
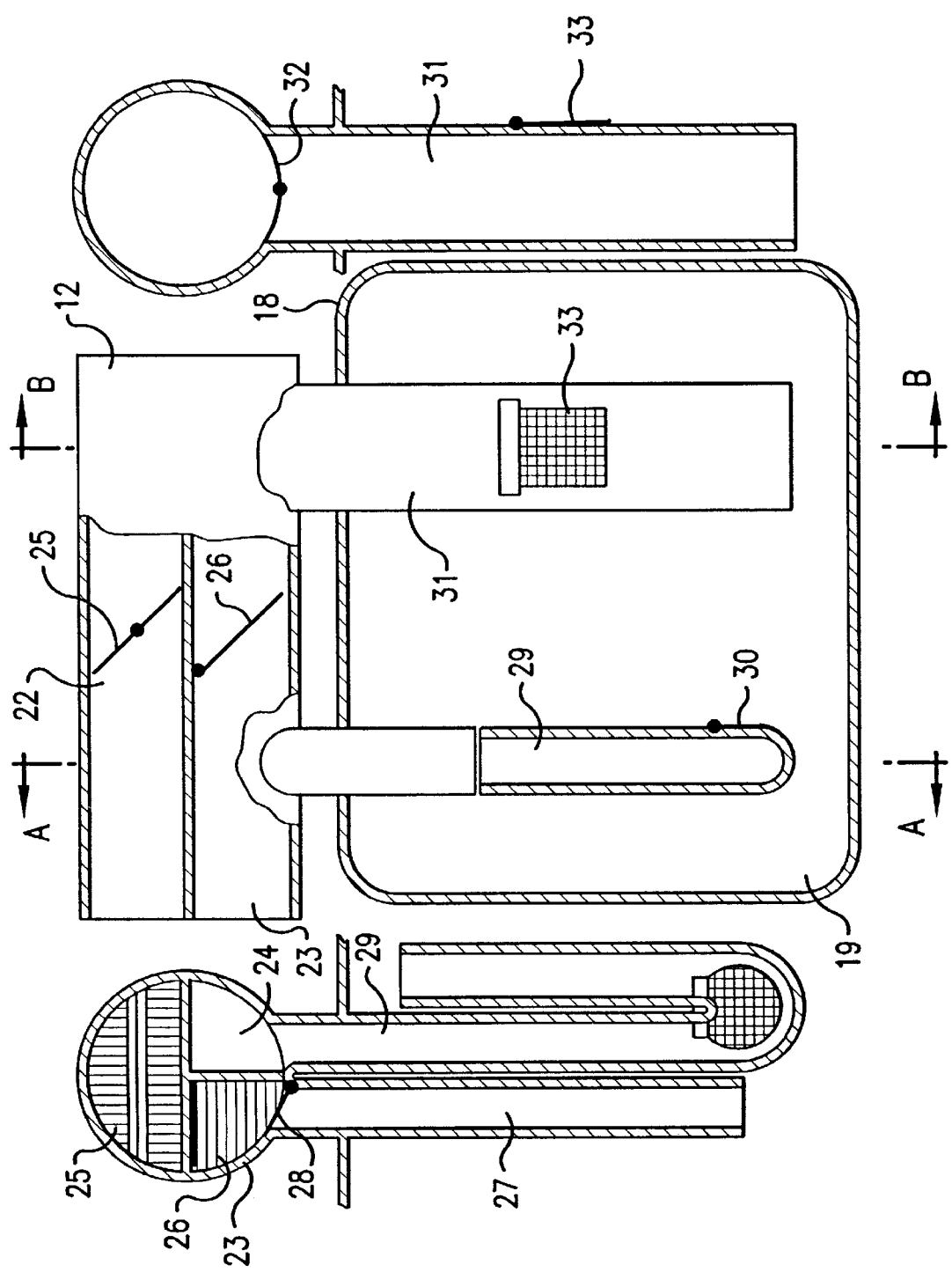
FIGS. 2a–e show a shunt resonator with the damper positions designed for various frequencies.
Figure 2B:
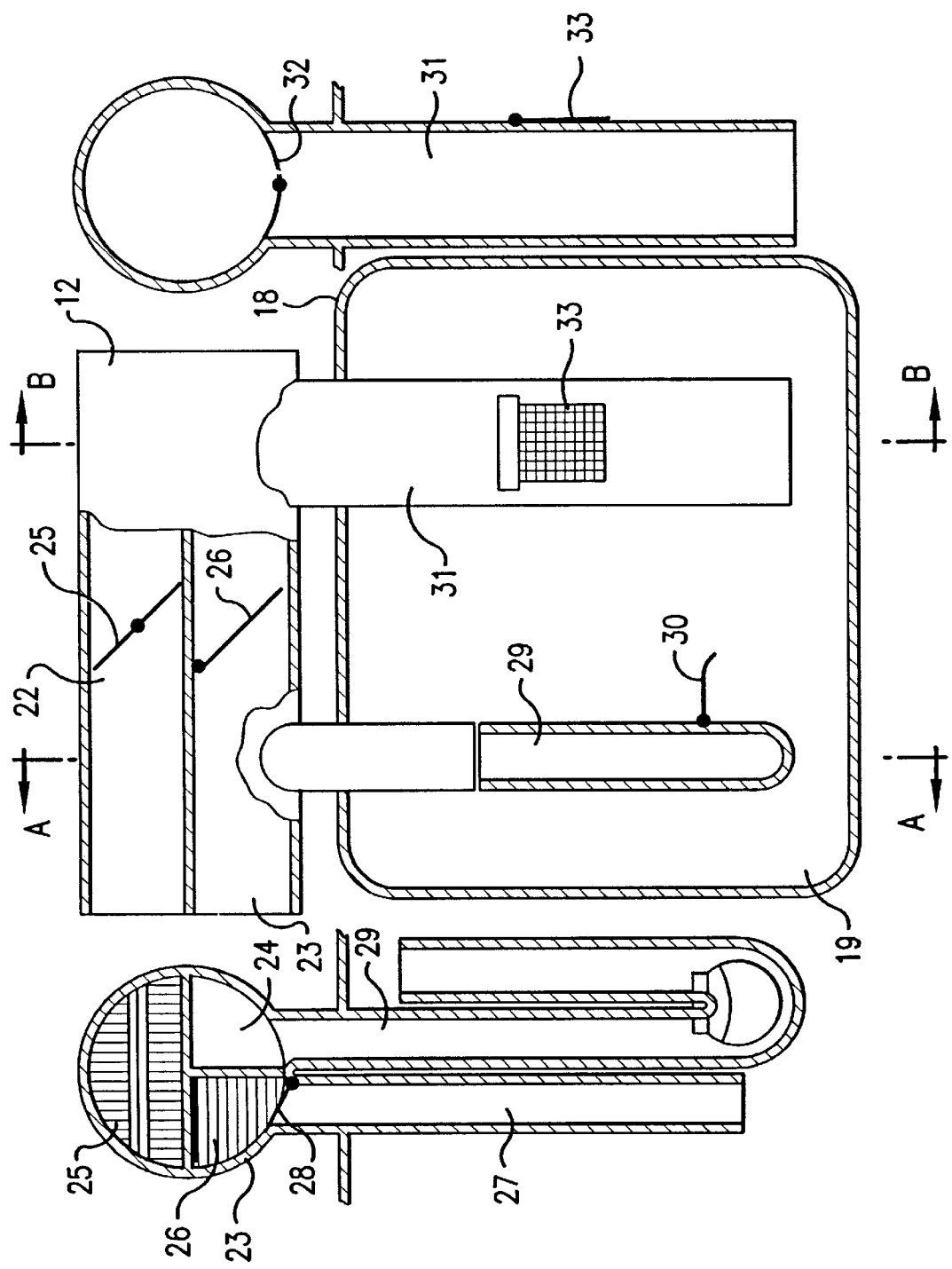

FIG. 2b shows a switching position in which the resonator frequency of the shunt resonator assumes a higher value, adapted to a higher rotational speed which is in the 60 Hz range. In comparison with the switching position shown in FIG. 2a, only the pivotable damper 30 is open. Thus the originally long neck is shortened and, as already mentioned, the resonator frequency is increased.

Figure 2C:
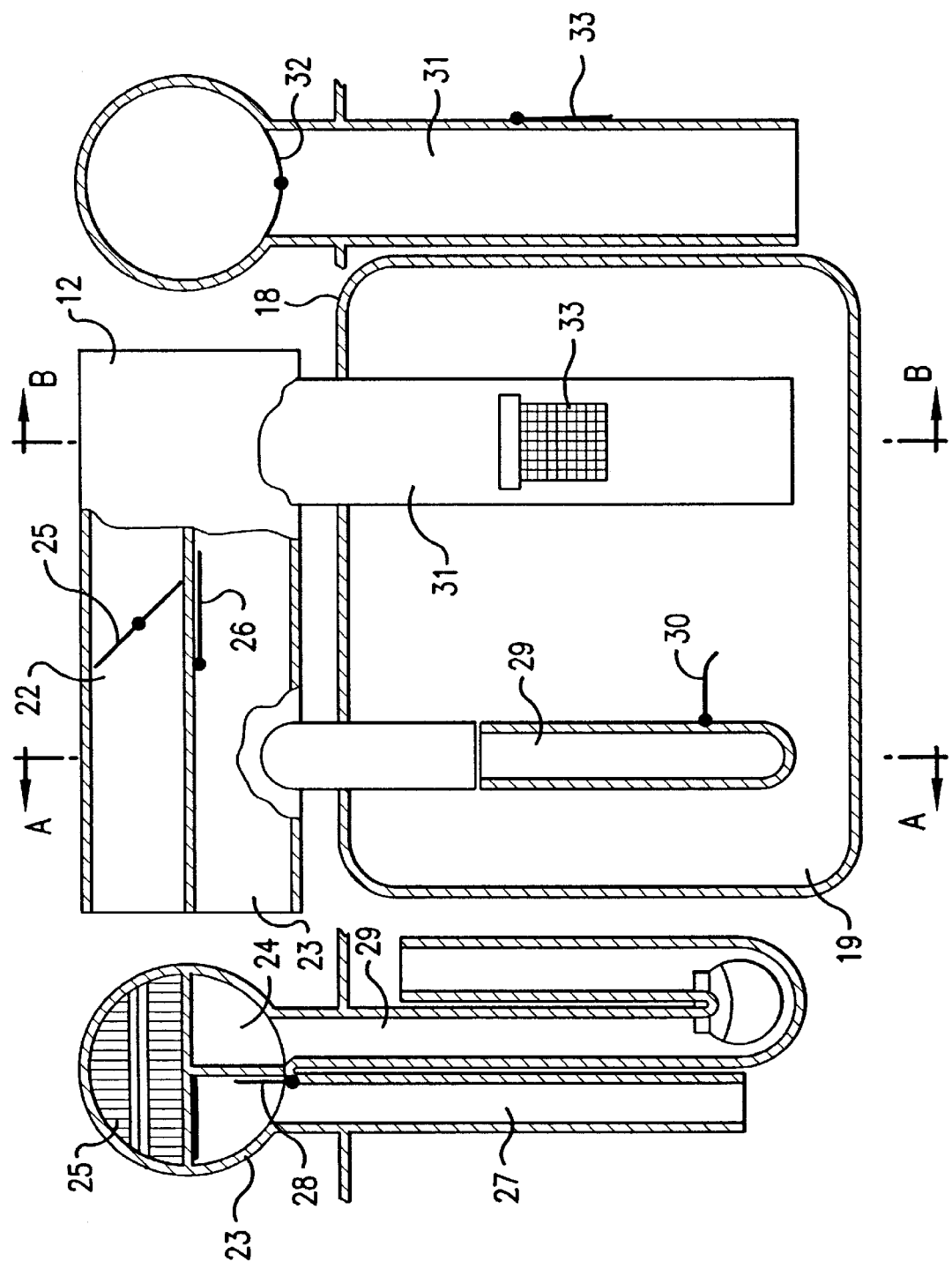

In FIG. 2c a switching position is achieved which produces an air intake noise suppression at about 80 Hz. In addition to the open pivotable damper 30, pivotable damper 28 as well as pivotable damper 26 are open. Thus the main duct is half open, as well as the two resonator neck parts 27 and 29. These two equally long, thin tubes act as one tube with a doubled cross-sectional area.

Figure 2D:
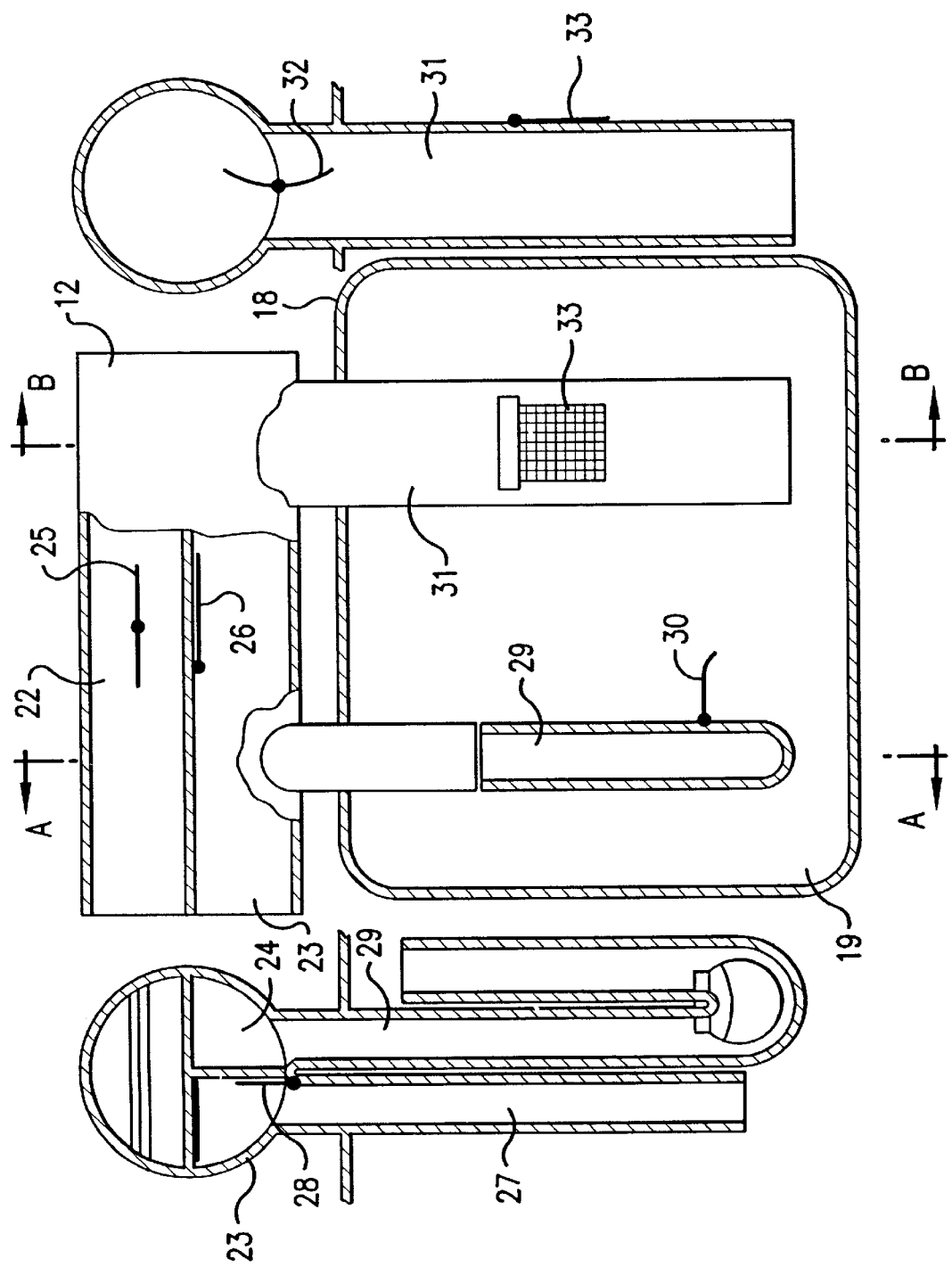

FIG. 2d shows, in addition to the already open dampers, an open rotatable damper 25 which opens the upper cross section of the segmented part of the main flow duct. Furthermore, the pivotable damper 32 is open and thus opens up the resonator neck 31 or produces a connection to the cavity of the shunt resonator. In this switching position, the resonance frequency lies at about 120 Hz.

Figure 2E:
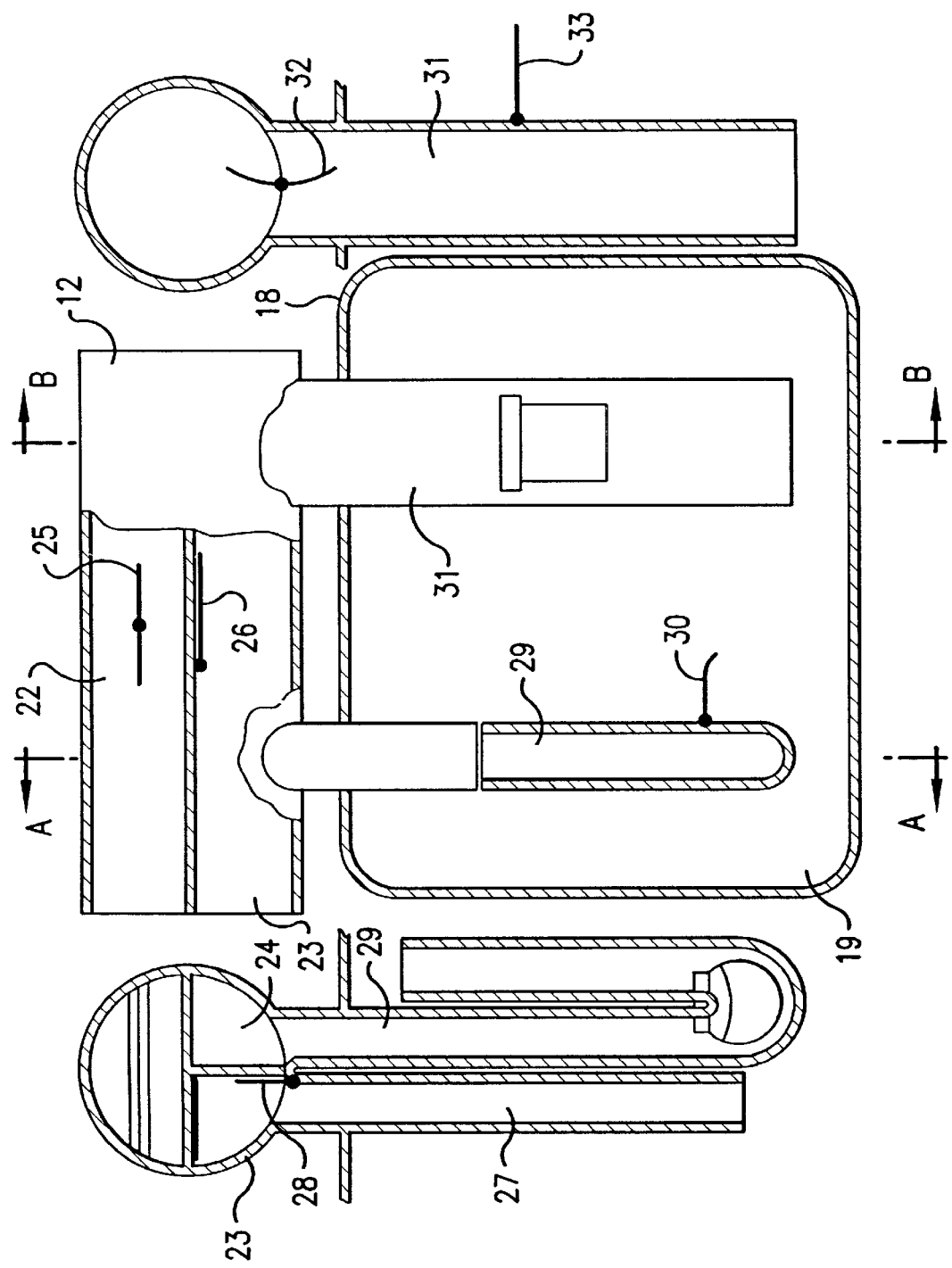
Figure 3A:
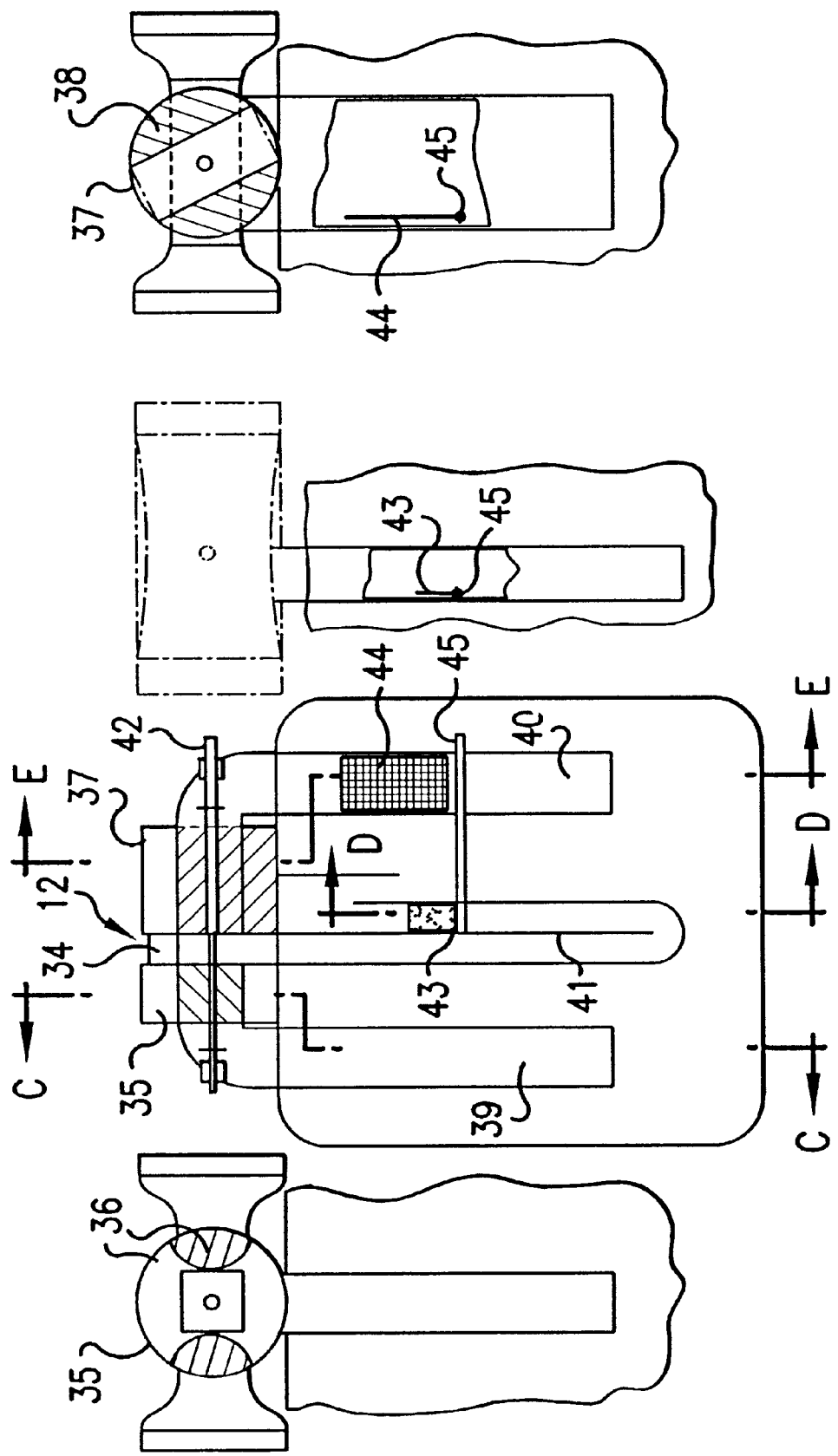
FIGS. 3a–e show a shunt resonator with the damper positions and coupled swivel dampers.
Figure 3B:
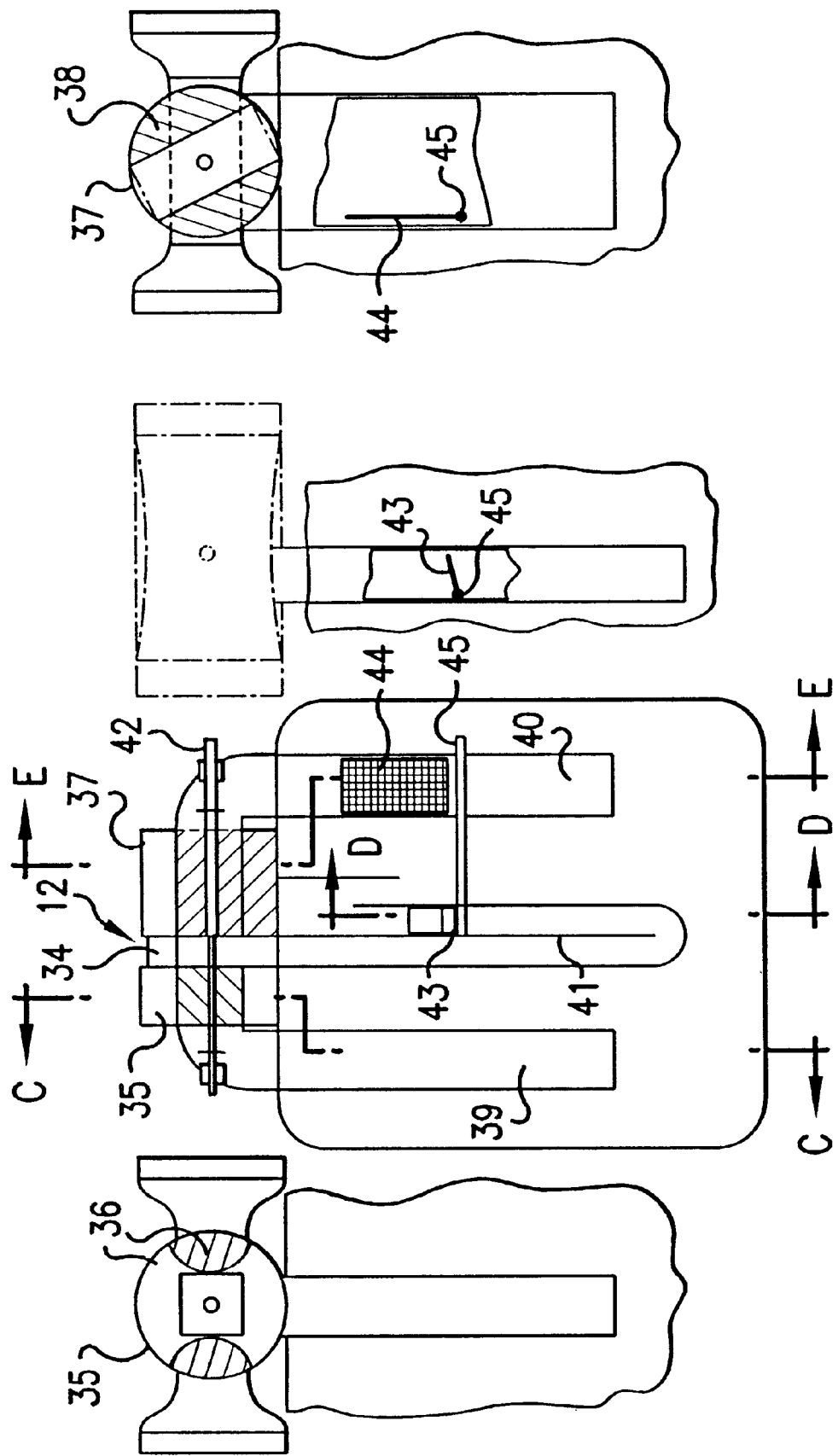
Figure 3C:
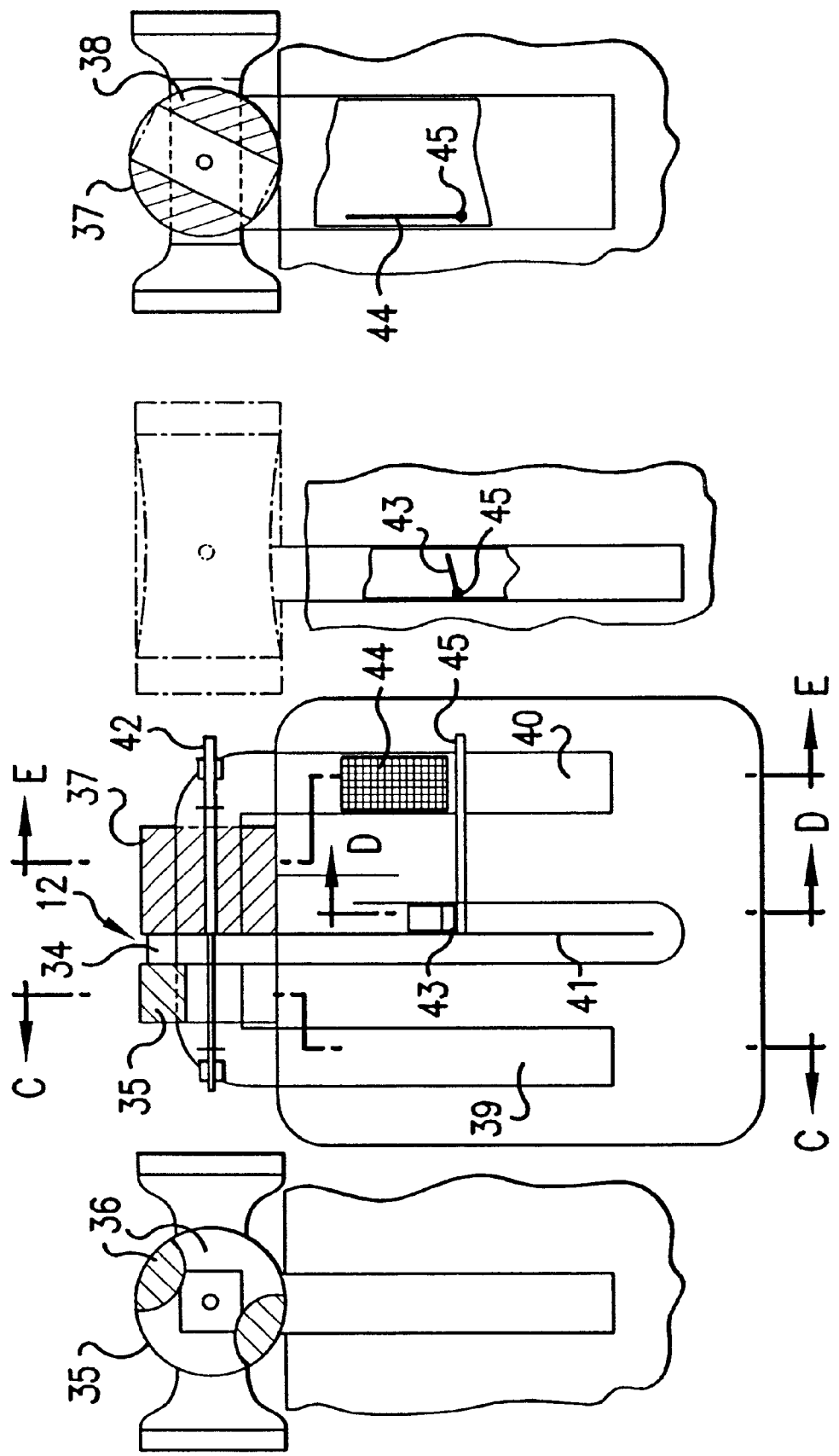
Figure 3D:
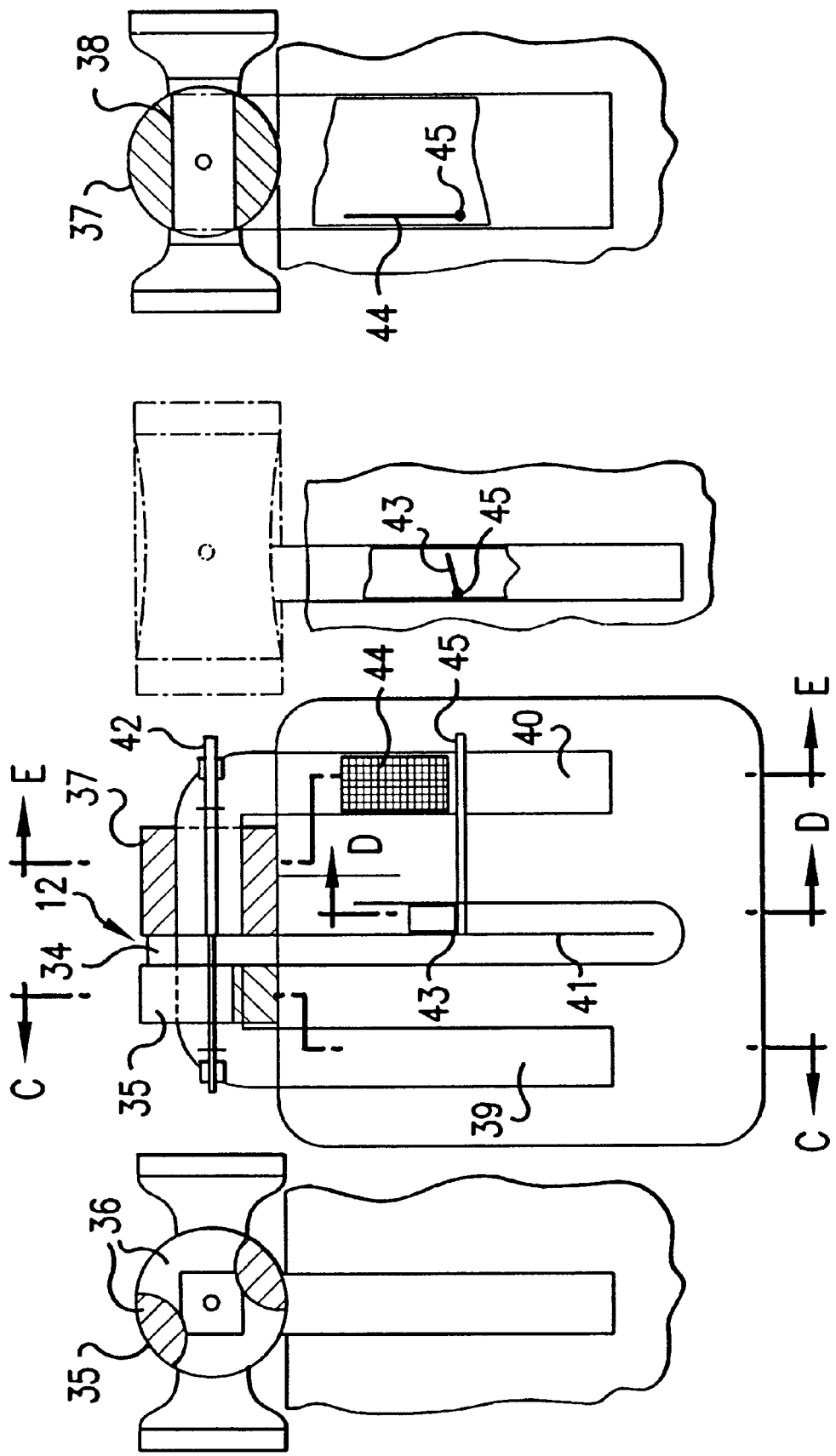
Figure 3E:
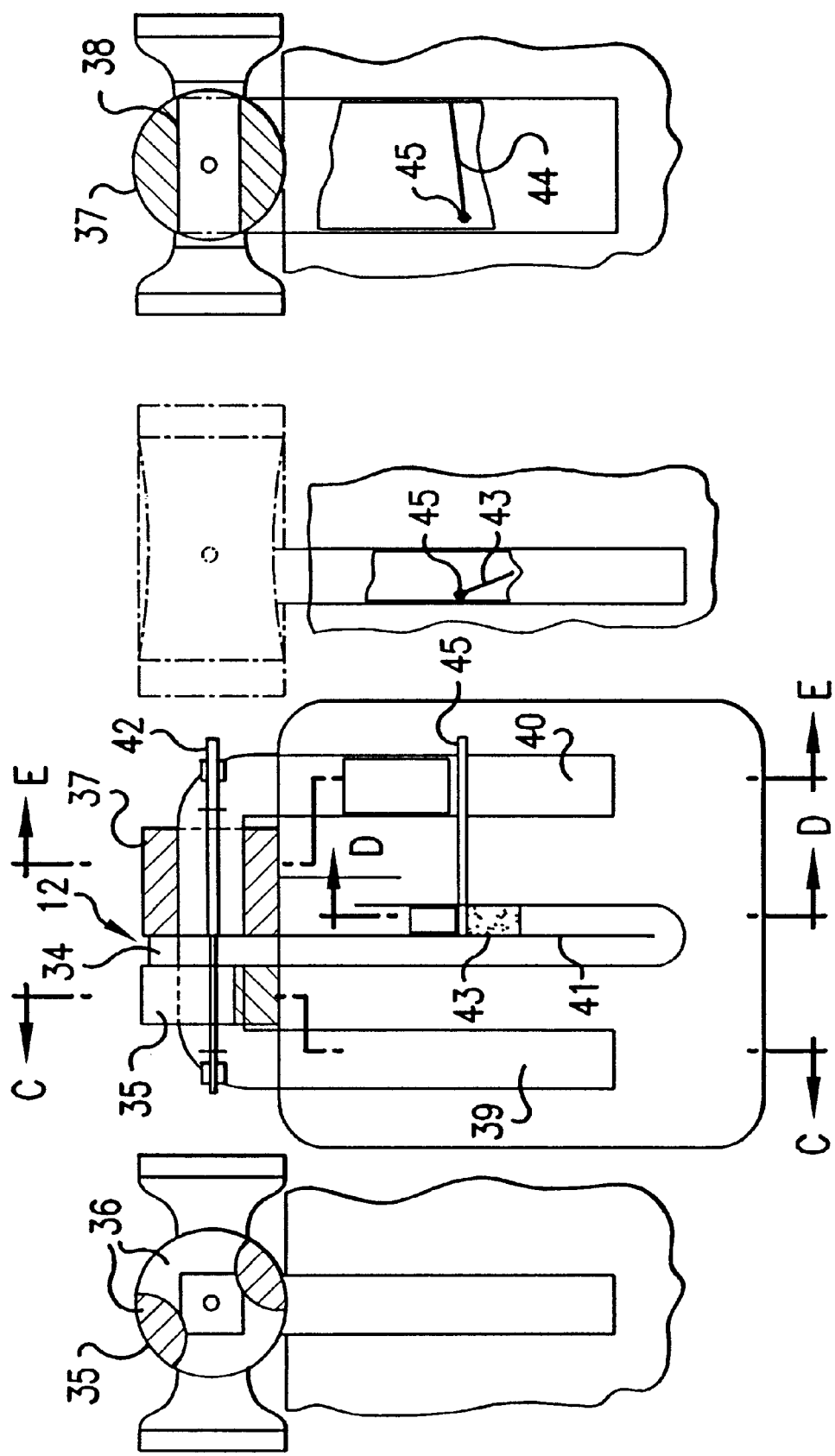

In the switching position shown in FIG. 2e, the resonance frequency lies at about 165 Hz. This corresponds to a motor rotational speed of 5,300 rpm of a 4-cylinder, 4-cycle motor. All pivotable dampers or rotatable dampers are open, i.e.,in comparison with the switching position in FIG. 2d, only the swivel damper 33 is additionally open, which results in a shortening of the resonator neck 31.

This series of examples makes it clear that along the motor rotational speed range a plurality of suppression frequencies can be established which are adjusted to match the individual tones determined to be undesirable. In this manner successful noise suppression is assured with only one fixed cavity. The closer one approaches with the branch ducts to the noise source, i.e., to the individual cylinder heads of the internal combustion engine, the more successful the noise suppression will be. Therefore, it is to be recommended to situate the shunt resonator on the clean-air side of the filter, as shown in FIG. 1. Thus the noise suppression will be carried out at a high energy level and the components that follow will be subjected to less stress. This manifests itself in reduced sound radiation from the walls of the affected components.

In FIG. 2, six individual adjusting devices are shown which are needed for switching into five frequency levels.

In accordance with FIGS. 3a–e, it is possible to control these individual actuators with ultimately two servo motors. The reduction to two servo motors or servo elements is achieved by using rotatable valves, each of which serves two damper functions. Moreover, it is possible to place two such multifunctional rotary valves on one shaft which can assume three switching positions. In this way it is possible to serve four individual functions with a single servo motor. The remaining two functions are assumed by two dampers mounted on one shaft, which together require the second servo motor. Here again, three switching positions are assumed.

FIGS. 3a–e show the corresponding principle. Each figure shows one of the five switching positions. The main flow tube or duct 12 contains three channel portions. One channel portion 34 is open all the way through, in which case the main duct in the middle figure runs perpendicular to the plane of drawing.

A smaller channel portion 36 is provided with a rotatable valve 35. A larger channel portion 37 is provided with a rotatable valve 38. The two channel portions 35 and 37 are each in communication with a respective resonator neck 39 and 40. Channel portion 34 is in communication with a resonator neck of smaller cross section but greater length than resonator neck 41. In the switching position shown here, which is designed for a frequency range of 40 Hz, only channel portion 34 of the main flow duct is in the open state. Channels 36 and 37 are each closed by the rotatable valves 38 and 35, respectively. The two rotatable valves 38 and 35 are disposed on a common shaft 42. In resonator neck 41 and in resonator neck 40 there is a pivotable damper 43 and 44, respectively. These two pivotable dampers are also fastened on a common shaft 45.

In the rest of FIGS. 3b–3e, the other four switching positions are shown. The following table shows the individual positions, both of the rotatable valves 35 and 38 and of the two pivotable dampers 43 and 44. Pivotable damper 44 is not fastened directly on the shaft 45, but is spring-biased against the window wall and does not move until a cam lobe contacts the damper. This takes place whenever the pivotable damper 43 is already open by 80°. When the shaft 45 rotates further an additional 80°, it moves the flap damper 44 to the open position.

| Switch step | Active freq. | Shaft 42 | Rotary valve 35 | Rotary valve 38 | Shaft 45 | Pivotable damper 44 | Pivotable damper 43 | Figure |
|---|---|---|---|---|---|---|---|---|
| 1 | 40 | Pos. 0° | Closed | Closed | Pos. 0° | Closed | Closed | 3a |
| 2 | 58 | Pos. 0° | Closed | Closed | Pos. 80° | Closed | Open | 3b |
| 3 | 82 | Pos. 60° | Open | Closed | Pos. 80° | Closed | Open | 3c |
| 4 | 116 | Pos. 120° | Open | Open | Pos. 80° | Closed | Open | 3d |
| 5 | 116 | Pos. 120° | Open | Open | Pos. 160° | Open | Open | 3e |

What is claimed is:

1. An air intake system for an internal combustion engine, comprising an air inlet, an air filter, a mainstream line, a plurality of individual ducts extending from the mainstream line to cylinders of the internal combustion engine, and at least one shunt resonator, wherein each of said at least one shunt resonator comprises at least one neck and a resonator volume, wherein said at least one neck is adjustable in at least one dimension selected from the group consisting of length and cross sectional area, and wherein said mainstream line is divided into three channel portions with two of said three channel portions each having a flap valve for controlled closing of each of said two channel portions and one of said three channel portions being in communication with one of said at least one shunt resonator.

2. An intake system according to claim 1, wherein dimensions of the neck are adjusted in dependence on at least one engine operating parameter selected from the group consisting of rotational speed and load state.

3. An intake system according to claim 1, wherein said neck dimension is adjusted by an adjustable damper.

4. An intake system according to claim 1, wherein said resonator volume is adjustable in volume.

5. An intake system according to claim 4, wherein volume of the resonator volume is adjustable in dependence on at least one engine operating parameter selected from the group consisting of rotational speed and load state.

6. an intake system according to claim 4, wherein said volume is adjusted by an adjustable damper.

7. An intake system according to claim 1, wherein said shunt resonator comprises first and second necks extending from said main duct to said resonator cavity, said second neck having a cross sectional area which is a multiple of that of the first neck.

8. An intake system according to claim 7, further comprising a third neck extending from said mainstream line to said resonator volume, said third neck having a cross sectional area corresponding to that of the first neck and a length twice that of the first neck.

9. An intake system according to claim 1, wherein the mainstream line is provided with two adjustable dampers and the neck are provided with at least two adjustable dampers, the adjustable dampers of the mainstream line being operated with a single shaft, and the adjustable dampers of the neck tubes being connected with a single shaft.

* * * * *